Jan. 9, 1962 F. F. GRANT 3,016,427

SATURABLE MAGNETIC HEAD

Filed Aug. 24, 1956 4 Sheets-Sheet 1

INVENTOR.
FREDERIC F. GRANT
BY
Allan Rothenberg
ATTORNEY

Jan. 9, 1962 F. F. GRANT 3,016,427

SATURABLE MAGNETIC HEAD

Filed Aug. 24, 1956 4 Sheets-Sheet 2

*INVENTOR.*
FREDERIC F. GRANT

*BY*
Allan Rothenberg
ATTORNEY

Jan. 9, 1962 F. F. GRANT 3,016,427

SATURABLE MAGNETIC HEAD

Filed Aug. 24, 1956 4 Sheets-Sheet 3

INVENTOR.
FREDERIC F. GRANT
BY
Allan Rothenberg
ATTORNEY

INVENTOR.
FREDERIC F. GRANT
BY
Allan Rothenberg
ATTORNEY

United States Patent Office 3,016,427
Patented Jan. 9, 1962

3,016,427
SATURABLE MAGNETIC HEAD
Frederic F. Grant, Bellflower, Calif., assignor to North American Aviation, Inc.
Filed Aug. 24, 1956, Ser. No. 606,045
9 Claims. (Cl. 179—100.2)

This invention relates to electromagnetic transducers and more particularly to a magnetic head of simplified miniaturized construction whose output signal is relatively independent of frequency and of the speed of the magnetic record medium.

In magnetic modulator heads embodying a pair of magnetic cores, the cores have been mounted in side by side relation whereby the dimensions of the assembly are increased. The problem of miniaturization is emphasized in multiple channel heads where several reproducing elements must be mounted in side by side relation for operation on adjacent channels of a record medium such as a relatively narrow tape, particularly in view of the use of the double cores for each channel. The necessarily diminished sizes of the elements of such heads and particularly the small core dimensions render the parts exceedingly difficult to handle during the steps of the assembly procedure. Particular difficulties in assembly arise in the winding of the small cores without physical deformation.

Functionally, the present invention provides a pair of parallel magnetic paths through two magnetic cores and a single pair of pole pieces through which flow alternating magnetic fluxes of opposite polarities induced in respective cores. There is provided a steady bias flux which flows in the same direction in each core in order to cause the cores to operate in a desired area of the hysteresis curves thereof and further to prevent distortion of the output signal which may be fed to a demodulator.

Structurally, each of a pair of core assemblies is of substantially C-shape and of the two assemblies are nested for minimizing of the volume thereof. A pair of pole pieces is suitably affixed to nonmagnetic supports and both asemblies are secured to the pole pieces and the supports. Each core assembly includes an elongated core of small dimensions which is mounted upon a nonmagnetic support of greater dimensions whereby an end portion of such core support may be conveniently mounted in a conventional core winding machine. Magnetic connecting members of cross sectional area large compared to the cross sectional area of the cores complete the core assembly and are secured to each core and its support.

An object of this invention is to improve the operation and construction of electromagnetic transducers.

A further object of this invention is the provision of a miniaturized transducer head having an output which is independent of the speed of the record medium and which has a relatively flat frequency response.

Still another object of this invention is the provision of a core assembly of minimum size which may be simply and conveniently wound without damage to the core.

A still further object of this invention is to improve the operation and construction of multiple channel transducer heads.

Another object of this invention is the provision of a miniaturized transducer head which may be quickly and simply fabricated and assembled.

Other objects and many of the attendant advantages of this invention will be readily appreciated as the same becomes better understood by reference to the following detailed description when considered in connection with the accompanying drawings wherein FIG. 1 is a schematic representation of an electromagnetic transducer of this invention;

Figure 1:
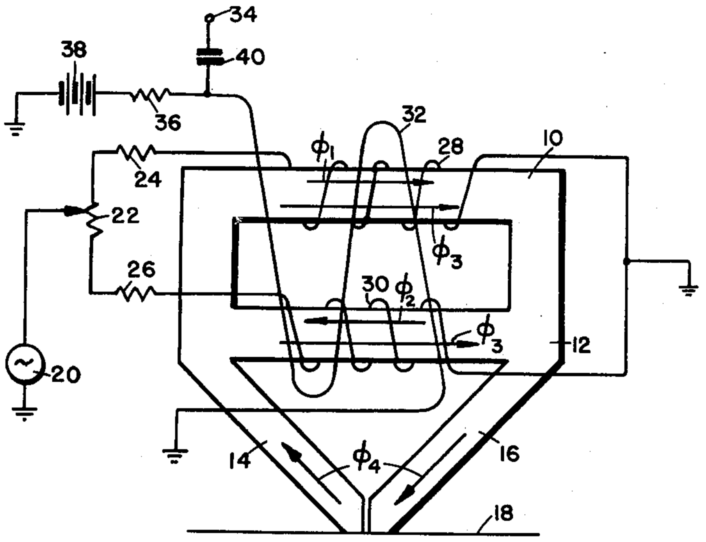
Figure 4:
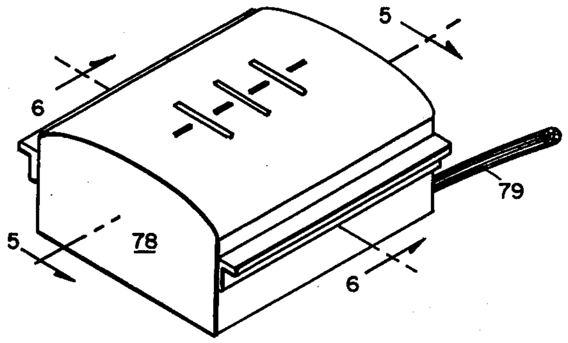
FIG. 4 is a pictorial representation of an assembled multiple channel head.
Figure 2:
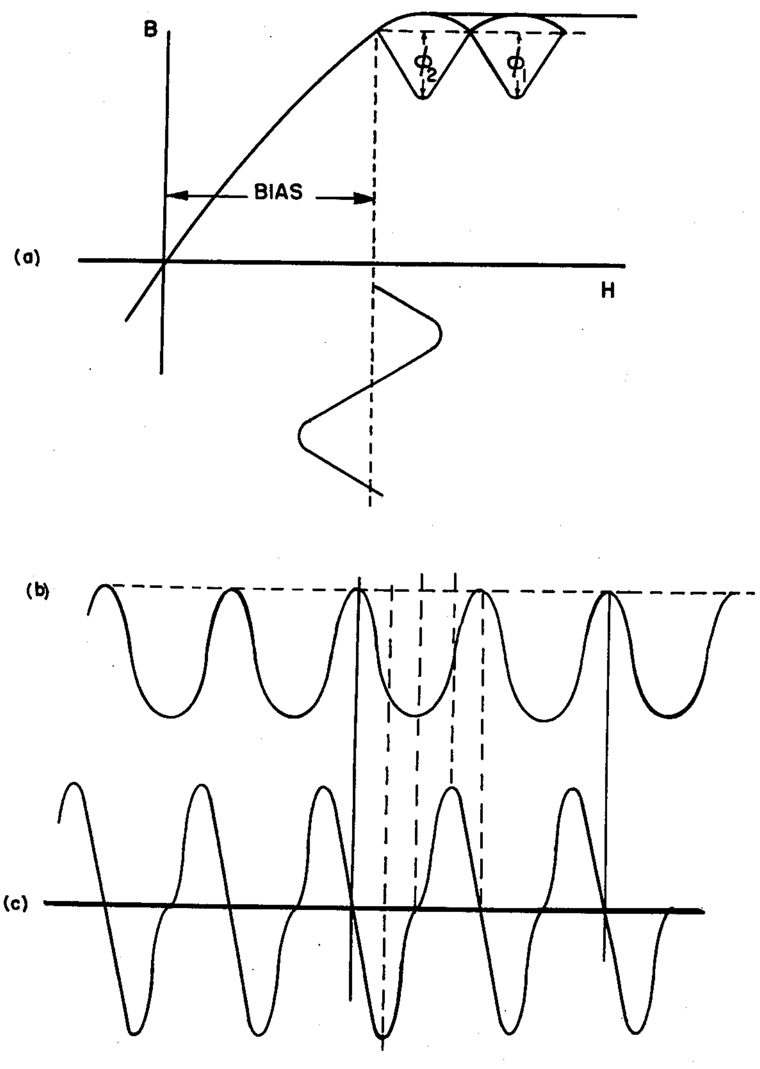
FIGS. 2 and 3 illustrate various magnetic and electrical wave forms.

Referring now to FIG. 1, each head comprises a pair of parallel cores 10, 12 and a pair of pole pieces 14, 16 having pole tips in closely spaced confronting relation arranged to have a magnetic record member such as, for example, tape 18 pass thereacross. An oscillator 20 feeds an A.-C. carrier signal such as, for example, a 130 kilocycle sine wave through resistors 22, 24 and 26 to exciting coils 28 and 30 which are respectively wound about cores 10 and 12 to induce alternating magnetic fluxes $\phi_1$ and $\phi_2$, of respectively opposite polarities as indicated, in the cores. A sensing winding 32 wound about both cores 10 and 12 provides a signal output between ground and terminal 34 and is supplied from D.-C. source 38 through resistor 36 with a bias current which causes a steady bias flux $\phi_3$ to exist in the same direction in each core. During one half cycle of the signal from oscillator 20 the core fluxes will be as indicated by the arrows with $\phi_3$ aiding $\phi_1$ and opposing $\phi_2$ while in the next half cycle $\phi_3$ opposes $\phi_1$ and aids $\phi_2$. While resistors 22, 24 and 26 are provided to compensate for core and coil differences due to different magnetic properties of the cores and differences in the windings 28 and 30, complete balance is not attainable in practice by virtue of the fact that the magnetization curves of the cores may never be completely linear. Consequently, in the absence of bias and signal, the net flux induced in the cores by the carrier from oscillator 20 will be the difference between $\phi_1$ and $\phi_2$ and the pattern of variation of this difference will be repeated for each half cycle of the carrier whereby the frequency of the induced net flux variation is twice that of the carrier. Since the greatest nonlinearity occurs at the knee of the magnetization curves, it is convenient to adjust the bias current to cause the cores to operate at this point as shown in FIG. 2*a*. With such bias flux, the flux variation in coil 32 will substantially follow the pattern of the variation of the algebraic sum of $\phi_1$ and $\phi_2$ as indicated in FIG. 2*b*. The voltage induced in coil 32 as a result of this flux variation will be proportional to the rate change of the flux and will approximate a sine wave of twice the oscillator frequency as indicated in FIG. 2*c*. This in the carrier signal which is passed to the output terminals through the D.-C. blocking capacitor 40. As indicated in FIG. 2*b*, the flux of the modulating or sensing winding 32 comprises a variation in the bias flux $\phi_3$ due to the effects of $\phi_1$ and $\phi_2$. The value to which this output flux drops in the absence of signal is the same for any chosen value of bias current and the voltage that is induced in coil 32 is of constant peak amplitude. If these variations in $\phi_3$ are made larger or smaller, a similarly varying voltage will be induced in coil 32 and the carrier will be modulated. If a magnetomotive force is provided across the pole tips as by placing a small bar magnet at the pole gap, a modulating flux $\phi_4$ will flow through the pole pieces and both cores, dividing equally between cores 10 and 12 to aid $\phi_3$ in both cores. Since variations in $\phi_3$ represent changes from its original steady state value caused by the difference of $\phi_1$ and $\phi_2$, the aiding flux $\phi_4$ causes a smaller change in $\phi_3$ as indicated by the dotted lines "*x*" in FIGS. 3*a*, *b* and *c*. If the polarity of $\phi_4$ be reversed to oppose $\phi_3$, the variation in flux becomes larger as indicated by the light lines "y" in FIGS. 3*a*, *b* and *c*. It will be seen that the magnitude of the variation of $\phi_3$ depends upon the magnitude of $\phi_4$.

Figure 3:
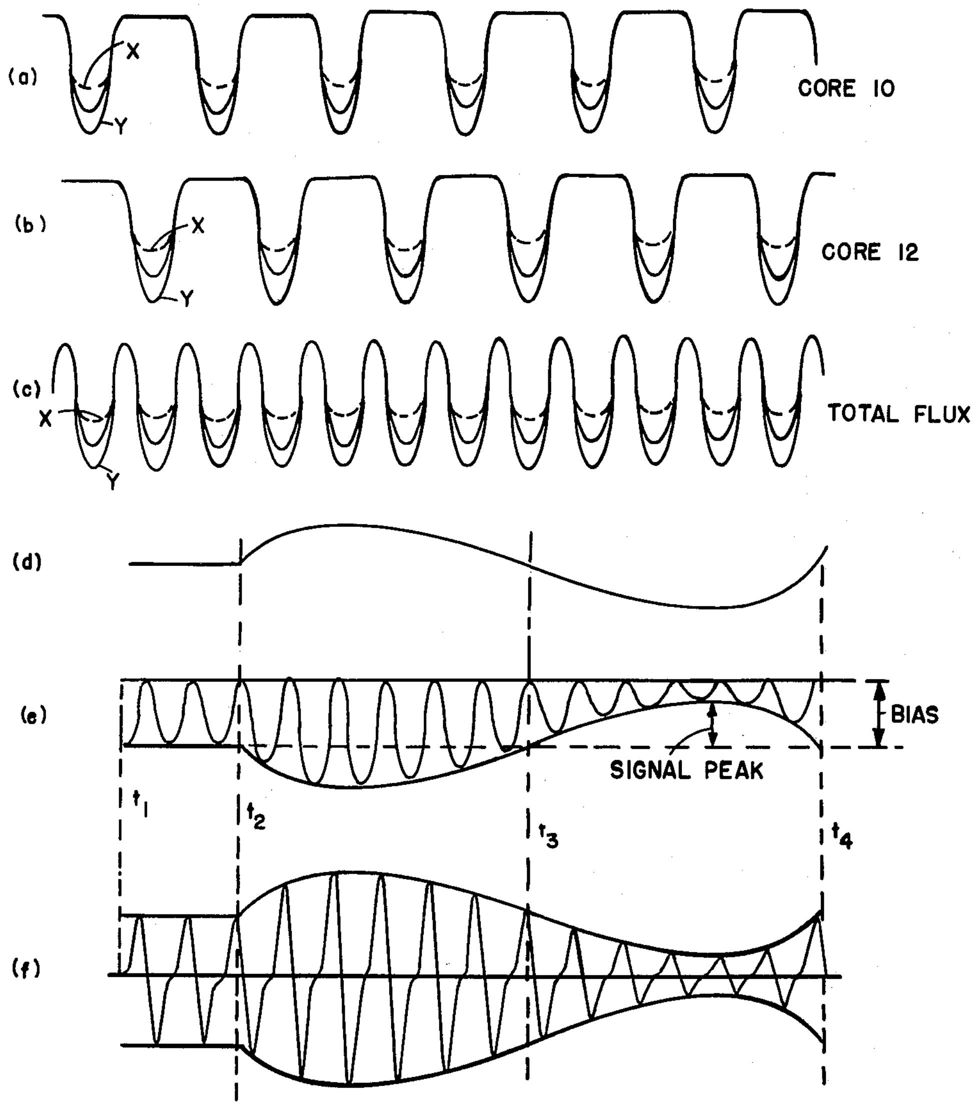
Figure 5:
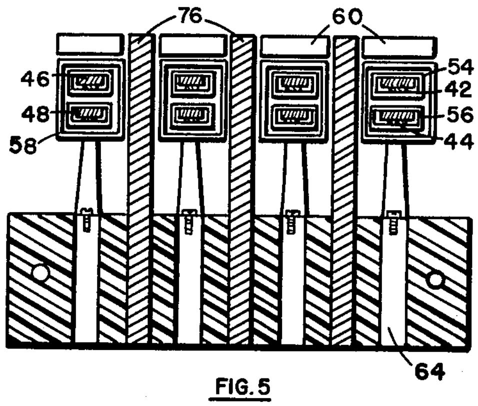
FIG. 5 is a sectional view taken on line 5—5 of FIG. 4 with certain parts omitted.
Figure 6:
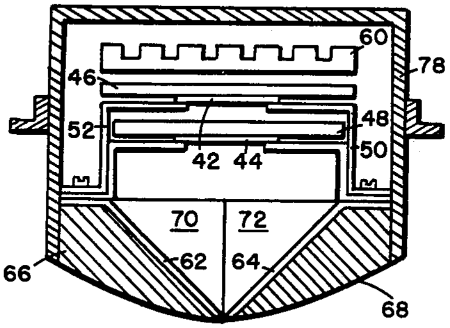
FIG. 6 is a sectional view taken on line 6—6 of FIG. 4 with certain parts omitted.

The magnetic tape, or the record medium, is in effect a series of magnetomotive forces of varying intensity and polarity which produces a varying flux $\phi_4$ in the cores as the record medium passes across the pole pieces. If the amplitude of the recorded signal be sinusoidal as indicated in FIG. 3*d*, there will be no modulation for the time $t_1$ to $t_2$ while from time $t_2$ to $t_3$ to effect an increase in the variation thereof, and from time $t_3$ to $t_4$ $\phi_4$ aids $\phi_3$ to cause a decrease in the variation thereof as indicated in FIG. 3*e*. Since the voltage induced in the sensing coil is proportional to the rate of change of the flux therein and the greatest rate of change of flux occurs when the amplitude of flux variation is greatest, it follows that the induced output voltage will be amplitude modulated in accordance with the recorded signal as indicated in FIG. 3*f*. Inspection of FIG. 3*e* will indicate another criterion for determining the magnitude of the bias if the recorded information is to be recovered from the modulated carrier output by a simple diode detector. It will be seen that the magnitude of the bias must be at least equal to or greater than the amplitude of the signal peak in order to prevent distortion or negative peak clipping of the signal.

In the conventional ring type of play back head, the output voltage is proportional to the rate of change of the magnetic signal and the frequency response drops with decrease in speed of travel of the magnetic medium. Since the output of the ring head is proportional to frequency and tape speed, relatively complex circuitry and structure are required to compensate for variations in the speed of travel of the recorder record medium and for the decrease in the signal-to-noise ratio at low frequencies. The modulator head of this invention has a relatively flat frequency reponse and is independent of record medium speed since the output is not a time derivative of the signal but is directly related to the amplitude thereof. In fact, the record medium need not be moving at all in order to provide an output as long as the record medium provides a magnetomotive force across the pole tips.

The particular construction of a preferred form of four channel play back head is illustrated in FIGS. 4 through 8. The two cores, 42 and 44 are made of a high permeability, rapidly saturating material such as Supermalloy, oriented silicon steel or the like, which is conventionally used for saturable cores. The cores are of relatively small cross sectional area, and for example, may be formed with dimensions of .015 inch width, .001 inch thickness and a .062 inch length whereby the cores are easily saturated and high density air or leakage flux may be developed about the cores. In order to facilitate handling and assembly operations upon the cores, each is mounted upon a rigid support 46 and 48 of nonmagnetic material such as, for example, silicon glass, by spot welding or cementing. A pair of Z-shape connecting members 50 and 52 are cemented to both the core and support and the support is of such a length that at least one end portion thereof will extend beyond the corresponding end of its core and the intermediate portion of the connecting member, whereby the C-shaped assembly of core and connecting members may be conveniently mounted for winding of the exciting coils 54 and 56 about the core by gripping the projecting end portion of the support 46 in the chuck of conventional coil winding apparatus. The cores are of relatively short length and the turns of the coil are substantially confined to an area about the core in order to effect maximum air flux about the core and optimum utilization thereof. After winding of the coils 54 and 56, each may be covered with a thin insulating tape (not shown) and extending end portions of the support 48 of the inner core are clipped to allow the nesting of the inner core assembly (which is of a length just less than the distance between connecting members 50 and 52 of the outer core assembly) within the outer core assembly. The two core assemblies may be held together by cement or insulating tape and mounted as a unit for winding of the sensing coil 58 by securing an extending end portion of the outer support in the coil winding machine. If desired, the extending end portions of this support may then be clipped. The several leads of the coil are brought out and connected to a terminal board 60 which may be conveniently secured by cementing atop the coil and core assembly.

Pole pieces 62 and 64 are formed, as are the connecting members 50 and 52, of a low reluctance magnetic material having a relatively large cross sectional area which may be, for example, on the order of 30 times as large as the cross sectional area of the core. After forming of the pole pieces, each is cemented in a support portion 66 and 68 within grooves 70 and 72 extending substantially diagonally across the supports. The support in the multiple head shown is formed in two halves 66 and 68 of a nonmagnetic material such as ceramic lava, each having four pole pieces received in grooves therein whereby when the support portions are secured together by means of bolts, each pair of pole pieces is positioned in a substantially V-shaped relation.

Figure 8:
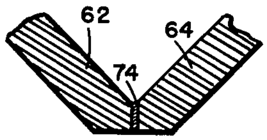
FIG. 8 illustrates a preferred configuration of the pole tips.
Figure 7:
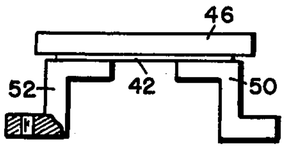
FIG. 7 shows a core assembly before winding.

As a result of machining or forming the magnetic pole pieces, they must be annealed to reduce the reluctance thereof, and for this reason the poles are cemented to the nonmagnetic supports which may be, for example, of ceramic lava, with a high temperature resistant cement such as Sauereisen No. 1, manufactured and sold by the Sauereisen Cement Co. of Pittsburgh, Pennsylvania, and the pole pieces are handled in the annealing process while mounted on the supports. The pole pieces have the tips thereof formed as indicated in FIG. 8 with a shim 74 of nonmagnetic material secured between confronting pole tips. The grooves in the supports are arranged to extend at an angular relation to each other of approximately 90° as a compromise between a small angle which will minimize the effects of flux from portions of the magnetic record medium not immediately adjacent the gap and the leakage effect of too small an angular relation. Each pole piece has the end thereof remote from its tip angulated to lie flat on one side of its support and each nested core assembly is then mounted on support 66, 68 by means of screws extending through both connecting members and pole pieces into the support. Magnetic shields 76 are mounted in suitably shaped grooves in the ceramic lava support and the assembly is then mounted in a low reluctance casing 78 having a suitably located aperture therein through which the electrical leads 79 may be brought out. In order to provide a more rigid assembly, a ceramic filler such as the high temperature cement utilized in the subassembly may be provided to fill the voids in the casing.

While there has been described a play back adapted to read four channels simultaneously, it will be readily appreciated that the basic principles of operation and construction of this invention may be equally well applied to recording heads and to single channel heads or heads adapted to operate on a record medium having more than four channels.

It will be readily appreciated that the disclosed invention provides improved operation in the form of high signal-to-noise ratio, increased reading strength, narrow channel width, flat frequency response and independence of speed travel of the record medium and at the same time is of sturdy construction, minimum size and adapted for simple and inexpensive fabrication.

Obviously many modifications and variations of the present invention are possible in the light of the above teachings. It is therefore to be understood that within the scope of the appended claims the invention may be practiced otherwise than as specifically described.

I claim:

1. An electromagnetic transducer comprising a first C-shaped core assembly, a second C-shaped core assembly nested within said first assembly, each assembly including a core and a coil thereon, a pair of pole pieces having pole tips in closely spaced relation and arranged to have a magnetic record member pass thereacross, means connecting said pole pieces to both said assemblies to provide a pair of magnetic paths each of which includes one of said cores and said pole pieces, means including said coils for causing alternating magnetic fluxes of respectively opposite polarities to flow in said cores, means for providing a bias flux for each path, and means for sensing the combined flux of both of said cores.

2. An electromagnetic transducer comprising a pair of mutually discrete core assemblies nested one within the other, each assembly including a saturable core of high magnetic permeability and of relatively small cross sectional area, means for causing alternating magnetic fluxes of respectively opposite polarities to flow in said cores, a pair of pole pieces of relatively large cross sectional area having pole tips in closely spaced confronting relation and arranged to have a magnetic record member pass thereacross, means for connecting said pole pieces to both said assemblies to provide a pair of magnetic paths each of which includes one of said cores and said pole pieces, means for providing a bias flux for each path, and means for sensing the combined flux of both of said cores.

3. An electromagnetic transducer comprising a pair of structurally discrete core assemblies nested one within the other, each assembly including a core having a coil wound thereon, means including said coils for causing alternating magnetic fluxes of respectively opposite polarities to flow in said cores, a pair of pole pieces of relatively large cross sectional area having pole tips in closely spaced confronting relation and arranged to have a magnetic record member pass thereacross, means for connecting said pole pieces to both said assemblies to provide a pair of magnetic paths each of which includes one of said cores and said pole pieces, means for providing a bias flux for each path, and an output coil wound about both of said cores for sensing the combined flux of said cores.

4. An electromagnetic transducer comprising a first substantially C-shaped core assembly, a second similarly shaped core assembly nested within said first assembly, each assembly including a core and a coil thereon, a pair of pole pieces having pole tips in closely spaced relation and arranged to have a magnetic medium pass thereacross, means connecting said pole pieces to both said assemblies to provide a pair of magnetic paths each of which includes one of said cores and said pole pieces, and means for sensing the flux of said cores.

5. An electromagnetic transducer comprising a pair of saturable cores of relatively small cross sectional area, a pair of pole pieces having pole tips in closely spaced confronting relation and arranged to have a magnetic record member pass thereacross, means for providing a pair of magnetic paths through said pole pieces and each of said cores respectively, said means including an angulated magnetic element of relatively large cross sectional area secured to each end of each core to provide substantially C-shaped nested core assemblies, means for causing alternating fluxes of respectively opposite polarities and equal magnitudes to flow through said paths, means for providing a steady bias flux in both said paths, and means for sensing the difference between the fluxes in said paths.

6. A magnetic reading head comprising a pair of nested core assemblies each comprising a saturable core of relatively small cross sectional area and a pair of magnetic connecting members of relatively large cross sectional area respectively secured to opposite end portions of each core, said connecting members extending from said cores to form a pair of substantially C-shaped core assemblies, an exciting coil wound on each core, a sensing coil wound on both cores, a nonmagnetic support having a substantially V-shaped notch formed therein, said notch having its apex on one side of said support and extending therethrough to the other side thereof, a pair of magnetic pole pieces of relatively large cross sectional area secured in respective legs of said notch, and means for securing said connecting members to said pole pieces and said support at said other side.

7. A magnetic reading head comprising a pair of individually distinct and nested C-shaped core assemblies each including a saturable core of relatively small cross sectional area, an exciting coil wound on each core, a sensing coil wound on both cores, a nonmagnetic support having a substantially V-shaped notch formed therein, said notch having its apex on one side of said support and extending therethrough to the other side thereof, a pair of magnetic pole pieces of relatively large cross sectional area secured in respective legs of said notch, and means for securing said nested assemblies to said pole pieces and said support at said other side.

8. A transducer comprising first and second mutually discrete core assemblies nested one within the other, each said assembly comprising a nonmagnetic support, a saturable core of relatively small cross section secured to said support, a pair of magnetic connecting members of relatively large cross section secured to opposite end portions of said core and support, and a coil wound about said core; and a pair of pole pieces having pole tips in closely spaced relation and arranged to have a magnetic medium pass thereacross, said pole pieces being respectively secured to respective connecting members of both assemblies.

9. The transducer of claim 8 wherein each of said connecting members is of substantially Z-shaped configuration, one end of each of said connecting members being spaced from and extending substantially parallel with said core and connected to respective pole piece.

References Cited in the file of this patent

UNITED STATES PATENTS

| | | |
|---|---|---|
| 2,536,260 | Burns | Jan. 2, 1951 |
| 2,608,621 | Peterson | Aug. 26, 1952 |
| 2,662,120 | Anderson | Dec. 8, 1953 |
| 2,674,031 | Buhrendorf | Apr. 6, 1954 |
| 2,674,659 | Buhrendorf | Apr. 6, 1954 |
| 2,676,392 | Buhrendorf | Apr. 27, 1954 |
| 2,677,019 | Buhrendorf | Apr. 27, 1954 |
| 2,722,569 | Loper | Nov. 1, 1955 |
| 2,754,569 | Kornei | July 17, 1956 |
| 2,768,243 | Hare | Oct. 23, 1956 |
| 2,830,130 | Greenwood | Apr. 8, 1958 |
| 2,855,466 | Wiegand | Oct. 7, 1958 |
| 2,891,236 | Eisenberg | June 16, 1959 |

FOREIGN PATENTS

| | | |
|---|---|---|
| 181,974 | Austria | May 10, 1955 |
| 1,101,937 | France | Apr. 27, 1955 |